No. 646,313. Patented Mar. 27, 1900.
J. G. A. RHODIN.
APPARATUS FOR DECOMPOSING ALKALI SULFATES.
(Application filed Mar. 18, 1899.)
(No Model.)

Witnesses

Inventor
John G. A. Rhodin
By James L. Norris
Atty

UNITED STATES PATENT OFFICE.

JOHN GUSTAF ADOLF RHODIN, OF SALE, ENGLAND.

APPARATUS FOR DECOMPOSING ALKALI SULFATES.

SPECIFICATION forming part of Letters Patent No. 646,313, dated March 27, 1900.

Application filed March 18, 1899. Serial No. 709,673. (No model.)

*To all whom it may concern:*

Be it known that I, JOHN GUSTAF ADOLF RHODIN, a citizen of the Kingdom of Sweden, residing at Glamis House, Montague road, in the village of Sale, in the county of Chester, England, have invented a certain new and useful Apparatus for Decomposing Alkali Sulfates for Production of Caustic Alkali and Copper Sulfate, (for which I have made application for a patent in Great Britain, dated August 18, 1898, No. 17,794,) of which the following is a specification.

This invention relates to the construction of electrolytic apparatus consisting of a cell divided by a porous partition into two compartments. The anode-compartment is charged with sodium sulfate, in which there is an anode of copper connected to the positive terminal of a source of electricity. The cathode-compartment is charged with an aqueous solution of caustic soda and has in it a metal cathode connected to the negative terminal of the source of electricity. When the cell is put in circuit, the sodium sulfate is decomposed, its sulfuric acid combining with a portion of the copper anode to form copper sulfate, while its sodium passes through the porous partition to the cathode-compartment, where it becomes oxidized, so as to form caustic soda by oxygen from the water of the solution in the cathode-compartment, hydrogen being liberated and escaping. Thus the copper-sulfate solution in the anode-compartment and the caustic-soda solution in the cathode-compartment become stronger and stronger and may from time to time be wholly or partly removed, or sodium sulfate may be continuously fed into the anode-compartment, copper-sulfate solution being drawn off therefrom and caustic-soda solution being drawn from the cathode-compartment.

The cathode is mercury, which forms an amalgam with the sodium liberated in the anode-compartment, this amalgam being decomposed in the presence of water regenerating the mercury and producing caustic soda by oxidation of the sodium.

The apparatus according to my invention for operating in the manner set forth is represented by the accompanying drawings.

Figure 1:
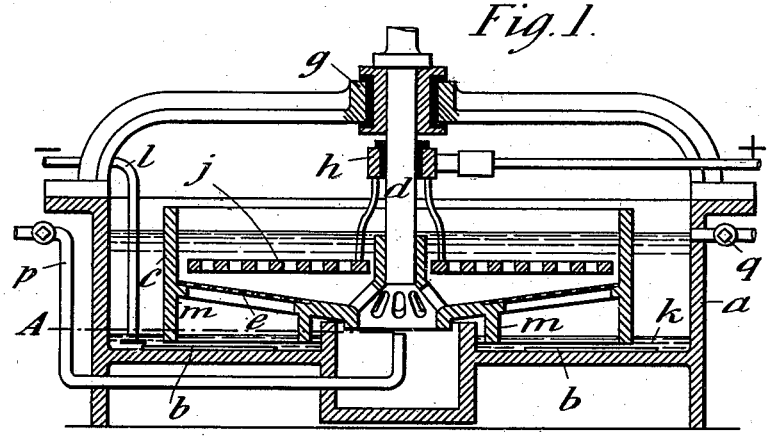
Figure 2:
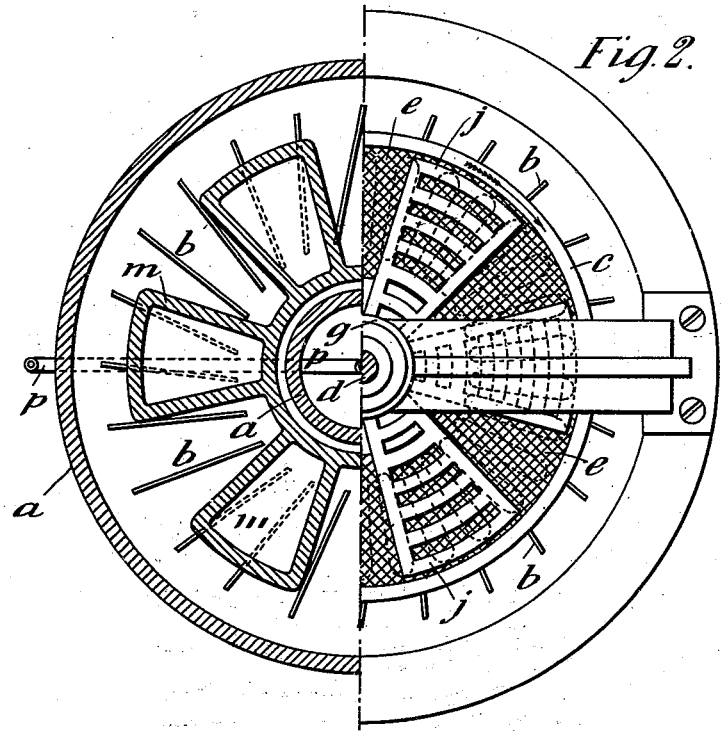

Figure 1 is a section, and Fig. 2 is in one half a top plan, and the other half is a sectional plan on the line A of Fig. 1.

Within a basin-like vessel $a$, of insulating material, the bottom of which has ribs $b$ inclined to radii and projecting a little upward, a smaller basin-like vessel $c$, also of insulating material, fixed on a vertical shaft $d$, is caused to revolve by any convenient means, such as a belt acting on a pulley on the shaft $d$. The lower part of the vessel $c$ consists of ribs, with openings between them, carrying a porous diaphragm $e$, which slopes down toward a central well. The shaft $d$ revolves in a bearing $g$ and has on it an insulated ring $h$, on which bears a brush connected by a conductor to the positive terminal of a source of electricity. From the ring $h$ are suspended several copper gratings $j$, which constitute the anode. A layer of mercury $k$ covers the lower part of the vessel $a$, and a conductor $l$ connects the mercury to the negative terminal of the source of electricity. On the vessel $c$ being charged with solution of sodium sulfate and the apparatus put in circuit and the shaft $d$ being caused to revolve the copper anodes $j$ are gradually dissolved by the sulfuric acid resulting from decomposition of the sodium sulfate producing copper sulfate, while the sodium forms an amalgam with the mercury. The amalgam is caused by the downwardly-projecting ribs $m$ forming compartments on the under side of the basin $c$ as it revolves in the direction of the arrow to travel along the spaces between the ribs $b$ toward the periphery of the vessel $a$, and during its travel the sodium becomes oxidized, forming caustic soda, which mixes with the solution in the annular space around $c$, while the mercury, being heavier when freed from the sodium, flows back toward the center to take up fresh sodium. When the contents of $c$ consist mostly of copper sulfate, while those of the annular space around it consist mostly of caustic-soda solution, these two compartments may be emptied by opening cocks in pipes $p\ q$. The copper sulfate can be electrolytically decomposed, producing sulfuric acid and metallic copper. When in the first process crude or impure copper is used as the anode, the impurities are mostly deposited in the well at the bottom of the cell and can be removed on withdrawing the vessel c. The cocks on the pipes p q may be so adjusted as to keep the flow of copper sulfate and caustic soda continuous, sodium sulfate being continuously fed into c.

Although sodium sulfate has been mentioned as the alkali sulfate treated, the bisulfate might also be dealt with in the same way, also potassium sulfate or bisulfate, and instead of copper being employed as the anode other metals which can be similarly dissolved in the sulfuric acid liberated from the alkali sulfate can be treated in the same way.

Having thus described the nature of this invention and the best means I know of carrying the same into practical effect, I claim—

1. In apparatus for decomposing alkali sulfates for production of caustic alkali and copper sulfate, the combination of a vessel, a vessel concentric within the same and provided with a porous diaphragm, means for revolving the inner vessel, a terminal extending within the outer vessel, and a terminal connected with copper anodes in the inner vessel above the porous diaphragm, as set forth.

2. In an apparatus of the character described, an inner and an outer vessel, a porous diaphragm within the inner vessel, means for revolving the inner vessel, copper anodes suspended within the inner vessel and a terminal extending down to a mercury cathode in the outer vessel, as and for the purpose specified.

3. The combination with the outer vessel containing a mercury cathode and having ribs upon the upper surface of its bottom, of the inner vessel having depending ribs about its center and sloping perforated diaphragms above the same, means for revolving the inner vessel, and copper anodes suspended within the inner vessel and connected with the terminal of a source of electricity, as set forth.

4. An outer vessel with ribs, an inner vessel with depending ribs and inclined perforated diaphragm, means for revolving the inner vessel, suspended copper anodes within the inner vessel, connected with one terminal of a source of electricity and the other terminal extending down to a mercury cathode in the outer vessel, as and for the purpose specified.

In testimony whereof I have hereunto set my hand in presence of two subscribing witnesses.

JOHN GUSTAF ADOLF RHODIN.

Witnesses:
GEO. J. B. FRANKLIN,
W. M. HARRIS.